United States Patent Office 3,301,918
Patented Jan. 31, 1967

3,301,918
RESINOUS COPOLYMERS OF HETEROCYCLIC DIENE ALCOHOLS AND HYDROCARBONS HAVING 5 TO 14 CARBON ATOMS
John E. Dereich, Pittsburgh, Pa., assignor to Neville Chemical Company, Pittsburgh, Pa., a corporation of Pennsylvania
No Drawing. Filed May 21, 1963, Ser. No. 282,155
17 Claims. (Cl. 260—829)

This invention relates to a process, and compositions prepared in accordance therewith, comprising copolymerization of heterocyclic diene alcohols with mono- and bi-cyclic olefins and diolefins, conjugated diolefins such as butadiene and isoprene, and heat polymerizable vinyl aromatic hydrocarbons such as styrene and vinyl toluene.

More specifically, it relates to the coplymerization of furfuryl alcohol with a mono- or bi-cyclic olefin or diolefin or mixtures thereof, to produce polymers in which the hydroxyl groups of the alcohol remain substantially intact. Thus, the resulting copolymer containing these functional hydroxyl groups may be further reacted to produce useful and unusual products.

The products of the copolymerization may be admixed with other types of resins such as the epoxy resins, urea fromaldehyde resins, phenol formaldehyde resins, polyurethane resins, etc. and the mixture subjected to curing to form thermoset resins having modified and desirable properties for many uses. Depending upon the selected ratios of copolymer of this invention with other resin systems employed and the method used, the mixed resins may be cured at room temperature or elevated temperatures in periods of time which can be controlled from the matter of a few minutes to several hours, depending upon the uses and the necessary conditions of pot life, etc. These compositions and methods of forming them also form a part of this invention. These mixtures of copolymers with epoxy resins and other resins mentioned, find advantage as adhesives for aggregates to be used as bridge decking and top coating, pavement or pavement top coating, terrazzo floors, floor and wall tiles, and other similar uses. The uncured mixture and the filler or aggregate are mixed and then applied and are then cured using conventional curing agents which have been added to the mass.

Broadly speaking the heterocyclic diene alcohol may have the following structural formula:

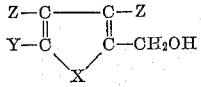

wherein X may be oxygen, sulfur or nitrogen, but is preferably oxygen; Y and Z may be hydrogen or an alkyl group and wherein one member of Y or Z may be an hydroxy methyl group. In the preferred embodiment X is oxygen and the substituent groups Y and Z are either hydrogen or the lower alkyl groups of $C_1$ to $C_5$. Furfuryl alcohol is a relatively inexpensive and readily available furan derivative which has been found particularly useful in making the compounds of the present invention.

The hydrocarbon feed stocks used in this invention may be the by-products of severe thermal cracking of natural gas or liquid petroleum stocks such as gas oils, straight run or cracked naphtha, refinery gases, etc. under conditions such that a high degree of unsaturation is produced. Among the processes employed are high temperature vapor phase cracking or other severe thermal cracking methods, with or without the addition of superheated steam. Such useful by-product fractions may boil in the range of about 30° C. to 350° C. The reactive constituents which are present in substantial quantities are mono-, bi-, poly-cyclic olefins and diolefins preferably having from about 5 to about 14 carbon atoms per molecule. They may also contain conjugated diolefins such as butadiene or isoprene, or these may be added from some other source. Heat polymerizable vinyl aromatic hydrocarbons such as styrene or vinyl toluene may be present. The hydrocarbon fractions may also contain hydrocarbons which are inert or substantially inert as far as the reaction of this invention is concerned. These may be parffins, mono-olefins, having straight or branched chains, aromatics such as benzene, toluene, xylene, etc., and cycloparaffins or naphthene hydrocarbons. As a rule the presence of these non-reactive components is not objectionable since they merely serve to dilute the reaction product and can be removed by distillation when the reaction has been completed.

Among the monomers which have been identified in these naphtha fractions are the following: dicyclopentadiene, dimers of methylcyclopentadiene, codimers of cyclopentadiene and methylcyclopentadienes, indene, methylindenes, vinylmethyl dicycloheptene, dimethylcyclohexadiene, methylcyclohexadiene, and cyclohexadienes. Also present are dicyclopentadiene, methylbicycloheptadiene, methylbicycloheptene, dimethylcyclopentadiene, cyclopentadiene, methylcyclopentadienes, styrene and its homologues, isoprene, piperylene, and others. There are undoubtedly many other hydrocarbons which are reactive in the process which have not as yet been identified in these streams. There is also the possibility that some unsaturated constituents are present which are not, per se, thermally polymerizable with the alcohol, but which may copolymerize with reactive hydrocarbons, and the resultant copolymer may in turn copolymerize with the alcohol. The reaction mechanism can thus be quite complicated and consequently is not readily understood.

These naphtha stocks are available from the petroleum or petrochemical industry and many of them are used commercially in thermal and catalytic polymerization processes to produce hydrocarbon resins having ball and ring softening points of 60 to 280° C. These find many useful applications in industry. These resins have limited compatibility, or are entirely uncompatible with certain resins such as epoxy resins, polyurethanes and ureaformaldehyde polymers. However, when copolymerized with furfuryl alcohol or other suitable alcohols as disclosed herein, products which are readily compatible with epoxy resins, polyurethanes, ureaformaldehyde polymers, etc. are produced.

It should be understood that narrow boiling fractions which are richer in certain individual cyclic olefins or diolefins may be employed rather than using a naphtha having the full boiling range characteristics. Pure compounds such as cyclopentadiene, dicyclopentadiene and the like are useful. For many purposes it is not necessary to use pure compounds since mixtures containing these compounds provide copolymers quite adeuaqte for many purposes such as binders for paying aggregates and the like.

In carrying out the process the alcohol such as furfuryl alcohol may be mixed with the cyclic olefin or diolefin and heated to a reaction temperature which may range from about 150° C. to about 290° C. and is preferably in the range of about 200° C. to about 240° C. The reaction is exothermic during the initial stages of the polymerization, and when once initiated may be controlled by suitable cooling means. The temperature should be below that at which the reaction because uncontrollable or at which decomposition occurs which would impair or destroy desirable properties of the resulting product. In general, higher temperatures and longer time tends to impair the color of the product. For some purposes, where color is not a factor, higher temperatures may be employed with resulting shorted reaction times.

Another factor influencing the choice of temperature is the proportion of furfuryl alcohol to the hydrocarbon undergoing reaction. Thus, it has been found that the higher the proportion of furfuryl alcohol the more difficult the reaction is to control and in general a lower temperature will be employed. For example, when using a contact time of 16 hours and a ratio of 30 parts furfuryl alcohol to 70 parts reactive hydrocarbon, the resultant resin was brown in color and charred when using a temperature of 240° C. However, at 220° C. the same mixture produced a brown resin having useful properties for many purposes and there was no evidence of decomposition.

The ratio of alcohol to hydrocarbon may be varied over a wide range although this is in part dependent on operating conditions, particularly temperature, as indicated. A broad range of 5% to 70% of alcohol based on the mixture of alcohol plus polymerizable hydrocarbon may be used. A preferred range is about 5% to about 50% alcohol. Excellent results have been obtained in the range of 10% to 40% alcohol by weight calculated on the reactive constituents of the mixture.

The temperature used may also depend to some extent upon the proportion of reactive hydrocarbons in the naphtha fraction used. Moreover, some hydrocarbons are less reactive than others and may either require higher processing temperatures or longer periods of time at a given temperature to effect the desired polymerization. There is no exact means of determining the precise operating conditions to be employed for any given mixture of furfuryl alcohol and hydrocarbon, particularly where the hydrocarbon fraction is a complex mixture. As a rule, if one carries out a reaction at approximately 200–260° C. in a pressure bomb for a period of 16 hours and examines the product obtained as well as the yield, he can then tell with reasonable certainty how he could adjust the temperature for a given mixture to produce the optimum results. As a general rule the lower the temperature the longer time required. The resin will in general be a lighter color at the lower temperature than at a higher temperature and this should be taken into consideration where the color of the product has a direct bearing on its value.

The thermal polymerization is carried out in the absence of a catalyst under pressures from slightly above atmospheric to 500 p.s.i.g. Usually the pressure is that generated by the system itself. Higher pressure may be used by use of an inert gas such as nitrogen. A convenient pressure range is about 80 to about 500 p.s.i.g. when operating in the range of about 220° C. to about 260° C. The pressure employed is generally sufficient to keep the reactants essentially in the liquid phase at the temperature employed.

The time factor, as indicated above, is dependent upon the temperature conditions employed, the ratio of alcohol to the hydrocarbon and the reactivity of the hydrocarbons undergoing polymerization. With some mixtures I have obtained substantial yields of more than 40% of light amber resin at 220° C. for a period of 4 hours. By raising the temperature to 240° C. the yield may be increased for the same time period or it may be possible to produce similar yields at a shorter time interval. The operation may be carried out in a matter of a few seconds or minutes at relatively high temperatures, particularly if the reaction products are cooled by quenching to a temperature below that at which further copolymerization ceases. In general, however, where time is not too important a factor in the manufacturing step, it is better to use reaction times of 4 to 30 hours, more or less, rather than run the risk of the reaction going out of control.

The alcohol may be used over a wide range of proportions. From about 5 to about 40 parts of furfuryl alcohol may be reacted with about 95 to about 60 parts of naphtha containing about 20% to about 100% by weight of reactive hydrocarbon components such as cyclic olefins and diolefins. Particularly useful compositions are made by copolymerizing about 10 to about 25 parts by weight of the alcohol with 90 to about 75 parts of the hydrocarbon fraction or the pure cyclic olefin or diolefin. When a pure or concentrated reactive hydrocarbon is employed it may be advantageous to incorporate an inert diluent such as toluene, xylene or other nonreactive solvent for the reaction product. This simplifies handling under certain conditions.

The crude liquid product may be used directly in certain uses such as blending with liquid resins, for example uncured liquid epoxy resins as described in detail hereafter. The crude naphtha usually contains sufficient unreacted hydrocarbons to keep the reaction mixture in liquid form. It is contemplated that the copolymer or the mixture with other resins may be thinned by additional mutual solvent where the reaction product is too viscous for easy handling.

If a solid resin is desired, the reaction product may be distilled, usually employing steam or vacuum or both, to remove the low boiling materials and produce a resin of varying degrees of hardness and softening in the range of 60° C. to 200° C. by the Ball & Ring method.

The recovered crude liquid product without distillation or after distillation to form a solid product, may be blended directly with other resins such as liquid or solid epoxy resins, uncured phenol-formaldehyde resins, uncured urea-formaldehyde resins, and polyurethanes. When such resins are in liquid form effecting the blend as liquids is frequently convenient. From 5 parts to 95 parts by weight of copolymer per 100 parts of copolymer plus the other resin may be used. From 25 to 75 parts of copolymer per 100 parts of total resin are particularly advantageous. In thus describing the compositions it should be understood that this is merely a statement of ratios of the resins and does not exclude the presence of other compatible resins, or of plasticizers or modifiers, or fillers, aggregates, pigments, dyes, etc.

When curing agents are used they are added at the point of use immediately before the resin is used. Suitable curing agents for epoxy resins include polyamines such as diethylene triamine, triethylene tetraamine, tetraethylene pentamine, etc., and polyamides which are reaction products of polycarboxylic acids with polyamines. Any suitable curing agent may be used.

Also, the liquid blends before or immediately after addition of a curing agent may be mixed with fillers at ordinary temperatures. The curing agent may be added to the mixture of resin and filler and then permitted to harden at ambient temperatures, say 20°–30° C. Alternatively the solid resins of this invention may be dissolved or suspended in the other resin, or the two resin components may be mixed as powdered solids, or may be melted and blended together. In the latter case the mixture may be applied hot to the filler or aggregate and the curing agent added. The mixture may be cast into the desired shape, or may be spread over a surface and troweled or rolled into place by conventional methods.

Thus, when forming a road-way surface or bridge deck topping, a mixture of aggregate such as sand, gravel, crushed stone, emery, quartz, crushed granite, or materials having a hardness of 7 of more on the Mohs' scale, may be used.

The mixture may comprise 5–60% of a copolymer resin of this invention and about 95 to 40% of a liquid epoxy resin of the bisphenol A-epichlorohydrin type. About 5–12% of a curing agent is added, based on the weight of the mixed resins present but the catalyst and the quantities thereof will depend on the individual chemical compound or blend selected for the purpose. For example, a well known epoxy curing agent is triethylene tetramine and the usual ratio of catalyst to resin ranges from 8–12 parts catalyst to 100 parts of total resin. Other known curing agents for epoxy, phenol formaldehyde, etc. resin portion of the mixture may be used in known proportions to effect hardening or curing.

The mixture is rolled or otherwise spread over the road surface and is compacted to a uniform thickness. Where the copolymer and epoxy blend are to be applied by pressurized spray systems the catalyst may be injected directly into the spray for intimate mixing and consequently a very rapid acting catalyst may be employed. Any suitable aggregate may then be distributed over the fresh surface by any number of methods which would include spraying, broadcasting or hand shoveling. This type of surface may be applied to a suitable substrate to gain protection from water, salt, or excessive wear and also provide a slip and skid resistant membrane. By proper choice of curing agents the time of setting to load bearing hardness may be varied from 30 minutes to several hours to suit the convenience of the applicator. Where the material is used to cover a large surface, such as a bridge decking, pavement, roof deck, etc., it is convenient to use a mixture which cures in 2–5 hours or more so as to avoid premature setting. When used for patching pavement or damaged sections of bridge decks, a mixture which can be made, cast into place and cured in an hour or less is sometimes advantageous since it involves a minimum of traffic tie up.

The copolymer of this invention, as well as the modified mixtures with epoxy resins, phenol formaldehyde resins, ureaformaldehyde resins, etc., may be used as coating formulations, such as paints and lacquers, or may be added to such compositions. When mixed to a pasty consistency with a filler such as sand, clay, diatomaceous earth, etc. it may be trowelled onto surfaces such as wood, metal, masonry, brick, etc. Pigment or dyes may be added to provide color. Mixtures with sand, emery or other hard aggregate of say 10–60 mesh, may be trowelled on stairways and wallways, sidewalks, etc. to provide an antiskid surface which is tough and wear resistant, as well as being resistant to chemicals, oil, gasoline, salt water, etc. They may be used for either interior or exterior purposes.

The following examples illustrate the preparation of the base resin and the properties of the copolymers produced.

EXAMPLE I

The resins were made from commercial grade furfuryl alcohol in the weight proportions indicated, and a commercial petroleum fraction made by severe high temperatures, low pressure cracking of a gas oil. The naphtha boiled in the range of about 115° C.–318° C. (10% point and 90% point respectively). The proportions are based on alcohol plus hydrocarbon equal 100.

After the mixtures were made they were placed into a pressure bomb with a total volume of 1200 ml. and filled only with 800 ml. of the mixture. The bombs were equipped with conventional relief valves and pressure gauges. To effect polymerization the bombs were heated to the desired temperatures and maintained at that point for 16 hours. In general, the pressure did not exceed 300 p.s.i.g. When the pressure exceeded 300 p.s.i.g., the bomb was vented as a safety precaution.

At the end of the reaction period the bomb was cooled and the heavy, viscous "poly oil" was removed and weighed. To determine the properties of the solid resin, the product was steam distilled at atmospheric pressure and 240–260° C. The yield and properties of the resin were determined on the resulting solid copolymer as shown in Table I.

*Table 1*

| Run | Parts by wt. Furfuryl Alcohol per 100 pts. Furfuryl Alcohol plus Reactive Hydrocarbon | Temp., ° C. | Yield, wt. Percent [1] Copolymer | R & B, ° C. | Iodine No. | Hydroxyl No. | Appearance |
|---|---|---|---|---|---|---|---|
| Control | 0 | 240 | 78.6 | 165 | 148 | 0.0 | |
| A | 10 | 240 | 81.5 | 170 | 167 | 3.3 | Brown Resin. |
| B | 20 | 240 | 82.5 | 174 | 155 | 6.2 | Do. |
| C | 30 | 240 | | Brown Charred Resin | | | |
| D | 40 | Vented at approximately 180° C. (temp. probably much higher), pressure over 300 p.s.i. | | | | | |
| Control | 0 | 220 | 73.4 | 110 | 150 | 0.0 | Light Amber Resin. |
| E | 10 | 220 | 65.5 | 129 | 161 | 58.9 | Light Amber. |
| F | 20 | 220 | 61.7 | 146 | 150 | 98.2 | Light Brown. |
| G | 30 | 220 | 66.1 | 163 | 123 | 118.0 | Brown. |
| M [2] | 20 | 220 | 43.2 | 116 | 163 | 7.3 | Light Amber Resin. |

[1] Based on furfuryl alcohol plus reactive hydrocarbon feed.   [2] 4 hours.

It will be observed that the higher temperatures gave higher yields for the same proportions of reactants. At higher concentrations of furfuryl alcohol the reaction tended to get out of hand at the higher temperature, but could be controlled by dropping the temperature.

At shorter reaction times both yield and melting point is reduced. As the proportion of alcohol increases the softening point of the isolated resin increases along with the hydroxyl number. This means that considerable flexibility is obtained in reaction conditions and in properties of the product.

EXAMPLE II

The poly oil product of Run M, Table I was esterified with a tall oil fatty acid having the following analysis:

| | Percent |
|---|---|
| Rosin acids | 7.2 |
| Fatty acids | 89.9 |
| Unsaponifiables | 2.9 |

Other characteristics include an acid number of 193, saponification number of 195 and a Gardner Color of 9+.

One hundred grams of Run M, 58 grams of the tall oil fatty acid and 5 grams of commercial xylol as an azeotropic agent were added to a 500 ml. three-neck flask fitted with a thermometer, reflux condenser and water trap. The flask was heated slowly and at 178° C. the first drop of water appeared in the trap. At 197° C. 5 ml. of water had accumulated in the trap using only enough heat to keep refluxing at a slow rate. The temperature was raised slowly to 213° C. over a 3½ hour period. A total of 8.9 ml. of water was removed from the water trap. The product was a viscous, dark brown liquid. Infra red analysis disclosed a strong ester band and some evidence of unreacted fatty acids. The esterified product shows good compatibility with alkyd paint systems and has utility as flexibilizer for short oil paint formulations.

EXAMPLE III

The "poly oil" of Run F, Example I was blended in equal parts by weight with a liquid epoxy resin of the bis phenol A-epichlorohydrin type made by the Shell Chemical Company and sold under the name "Epon 828" with an epoxide equivalent of 185–192. Fifty grams of "poly oil" was combined with 50 grams of Epon 828 by mixing the two materials at room temperature. The mixture was readily compatible and formed a clear brown liquid. Twelve parts of commercial triethylene tetramine was added to the mixture and after stirring, a number of aluminum forms were filled to prepare flexural strength test specimens. After standing overnight at room temperature the resin became rigid and hard. Upon removing the aluminum foil the bars were tested and found to have a flexural strength of 10,000 to 11,000 p.s.i. Control bars of Epon 828 cured under the same conditions had a flexural strength of 12,000 to 13,000 p.s.i. but were less flexible than the mixture which makes the blend more applicable for many purposes. The mixture may be used as a binder for fillers and aggregates such as tile, floors, pavement, etc.

EXAMPLE IV

A mixture of 50 parts heavy coal tar with the following typical properties

| | ASTM | | |
|---|---|---|---|
| Water, percent by vol | D 95 | B 2 | 0.5 max. |
| Sp. gr., 25/25° C | D 70 | B 5A | 1.14–1.24. |
| Spec. Visc. Engler 50 ml., 50° C | Fed. Spec. SS–R–406b, Method 213.0. | B 10 | 17–26. |
| Insol. $CS_2$, percent | D 4 | B 13 | 5–15. |
| Ash, percent | D 271 | B 9 | 0.25 max. |
| | D 20 | C 9 | |
| Distillation: | | | |
| Percent to 170° C | | | 2 max. |
| Percent to 270° C | | | 20 max. |
| Percent to 300° C | | | 30 max. |
| Soft. pt. of Dist. Residue (R & B), ° C. | D 36 | D 22 | 35–55. | was blended with 25 parts Epon 828 liquid epoxy resin, 25 parts of copolymer "poly oil" of Run F, Table I, and catalyzed with 12 parts of commercial triethylene tetramine. The components of this mixture are mutually compatible and substantially cures in 4 hours at ambient temperatures. This blend continues to cure over a period of time reaching a plateau in about 7 days after which the blend may continue to harden or cure only to a very slight degree over a period of years. For most purposes, the product may be used as a surface coating when combined with various fillers almost as soon as the mixture becomes hard. This will depend upon ambient temperatures above 60° F. and at temperatures around 90 to 100° F. the hardening period may be as little as from 1 to 1½ hours. When mixed with a filler consisting of asbestos fibers with clay or powdered limestone and applied before curing, it may be used for example as a pipe coating. The mixture of the tar and copolymer-epoxy resin product of this invention may be filled with aggregate and used as a sealing medium over concrete or asphalt cement road surfaces. The ratios of aggregate to binder are usually about the same as for asphalt cement.

EXAMPLE V

The polyoil of Run F was reacted with a commercially available mixture of 2,4 and 2,6-tolylene diisocyanate isomers (TDI) to form a moisture activated rapid drying film.

Into a 500 ml. three-neck flask fitted with a stirrer, reflux condenser and thermometer was placed the following materials

| | Parts by weight |
|---|---|
| Mondur TD–80 (TDI) | 31 |
| Polyoil Run F | 100 |
| Xylol | 130 |
| Cellosolve acetate | 65 |

The materials formed a clear brown solution which was heated and stirred at 90° C. for 3 hours. After cooling to room temperature the solution was sprayed onto a steel Q panel and allowed to cure under constant temperature (70° F.) and humidity (50%). The panel was dry to the touch in 5 minutes. After 24 hours the film was hard and scratch resistant. However, the film would not withstand a 90° bend without cracking.

A second reaction using a commercial polyether along with polyoil F was prepared as follows:

| | Parts by weight |
|---|---|
| Mondur TD–80 | 27 |
| Polyoil Run F | 75 |
| LM–52 polyether [1] | 25 |
| Xylol | 134 |
| Cellosolve acetate | 67 |

[1] Union Carbide triol with a hydroxyl content of 52.

The same reaction conditions as listed above. Sprayed samples required 20 minutes to dry to the touch and after 24 hours at constant humidity and temperature, formed a hard flexible film. Films of this nature find utility as protective coatings for wood and metal. Other di- and poly-isocyanates which may be used include diphenylmethane diisocyanate, triphenyl methane triisocyanate, hexamethylene diisocyanate, naphthalene diisocyanates, polymethylene polyphenyl isocyanate, bitolyl diisocyanates, dimethyl diphenylmethane diisocyanates and others used in producing poly urethanes. Various polyols may also be used including glycols, glycerol trimethylol ethane, polypropylene glycols, polypropylene glycol adducts of sorbitol and of glycerin, and propane, butane and hexane triols.

EXAMPLE VI

A polyoil was made by reacting 20% furfuryl alcohol with 40% of an unsaturated petroleum fraction boiling between 139° C. and 318° C. and 40% of a second highly cracked petroleum fraction boiling at 115°–250° C., at 240° C., for 16 hours. Both of these naphthas are commercially available and are used in the manufacture of hydrocarbon resins. They are rich in cyclic olefins and diolefins and contain some styrene. The polyoil was blended with equal parts of Epon 828 and cured at room temperature with 8 parts of triethylene tetramine to form a hard flexible film. Mixtures of this kind may be used as binders for aggregates such as sand, gravel, etc. to form terrazo floors, for coating metal, brick, masonry, etc., as bridge decking or gasoline and salt resistant layer over regular paving materials for roads, airfield runways, etc.

EXAMPLE VII

A polyoil was made by reacting 75 parts of the naphtha boiling at 115–250° C. of the previous example, with 25 parts of furfuryl alcohol at 240° C. for 16 hours. The polyoil was mixed with equal parts Epon 828 and the mixture cured with TETA (8–12 parts). It cured at room temperature to a hard but very flexible film. Uses are similar to those of Example VI.

EXAMPLE VIII

A film of polyoil, Run F, spread over a steel Q panel remains thermoplastic when heated to 350° F. for 15 minutes. However, the addition of a small quantity of a commercial urea-formaldehyde resin will allow the film to thermoset under the same conditions. For example, a mixture of 70 parts polyoil, Run F, and 30 parts of Uformite F–240 manufactured by Rohm & Haas will cure to a hard, brittle, thermoset film at 350° F. for 15 minutes. The ureaformaldehyde resin had the following specifications:

| | |
|---|---|
| Solids, percent | 60 |
| Solvent | butanol-xylol |
| Gardner Holdt Visc. | L–Q |
| Gardner color | colorless |
| Acid No. | 3–8 |
| Wt./gallon | 8.5 |
| Mineral Spirits Tolerance, percent, minimum | 500 |

EXAMPLE IX

A mixture as described in Example VIII, in proportions of 3.3 grams polyoil, Run F, and 2.5 grams Uformite F–240 were combined with 11.7 grams of a commercial epoxy ester Epi-Tex–199 manufactured by the Jones-Dabney Co. Epi-Tex–199 has the following specifications:

Solids, percent _____ 60
Solvent _____ mineral spirits
Gardner Holdt Visc. _____ Z–Z$_2$
Gardner color _____ 8
Acid No. (on solids) _____ 10

This blend cures rapidly to a clear, hard, flexible film at 350° F. for 5 minutes. A control using 11.7 grams of Epi-Tex–199 with 2.5 grams of Uformite F–240 will also cure at 350° F. in five minutes but the film is slightly tacky and cloudy. Epi-Tex–199 alone does not cure under these conditions. This blend is useful in epoxy modified paints, yielding formulations which are rapid drying and form a tough, flexible film, resistant to corrosion and abrasion.

The above examples are given for purposes of illustration and are not to be construed as limiting the invention to the exact procedures shown and described.

I claim:
1. A thermal polymerization process for making a resinous copolymer characterized by a hydroxyl number of at least 7.3 which process comprises mixing (a) a heterocyclic diene alcohol having the formula

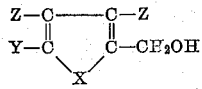

wherein X is oxygen, sulfur or nitrogen, and Y and Z are hydrogens or lower alkyl groups and (b) a reactive olefinically unsaturated hydrocarbon feed which contains 5 to 14 carbon atoms per molecule and is copolymerizable with said diene alcohol, said alcohol and unsaturated hydrocarbon feed being mixed in a proportion of about 5 to about 7 parts of the alcohol per 100 parts of mixed alcohol and unsaturated hydrocarbon, and heating the mixture in the absence of a catalyst at a temperature above about 150° C. but below that at which substantial decomposition of the resulting copolymer occurs and at a pressure sufficient to keep the reactants essentially in the liquid phase until a resinous copolymer-containing product is obtained.

2. A process according to claim 1 wherein said alcohol is furyfuryl alcohol and wherein said reactive hydrocarbon feed comprises poly-cyclic diolefins.

3. The process according to claim 1 wherein said alcohol is furfuryl alcohol and said hydrocarbon feed is selected from the group consisting of mono-cyclic olefins, poly-cyclic olefins, mono-cyclic diolefins, poly-cyclic diolefins, aliphatic conjugated diolefins, heat polymerizable vinyl aromatic hydrocarbons, and mixtures thereof.

4. A thermal polymerization process for making a resinous copolymer containing functional hydroxyl groups which process comprises mixing (a) furfuryl alcohol and (b) a reactive olefinically unsaturated hydrocarbon feed which contains 5 to 14 carbon atoms per molecule and is copolymerizable with said furfuryl alcohol, said alcohol and unsaturated hydrocarbon feed being mixed in a proportion of about 10 to 50 parts of the alcohol per 100 parts of mixed alcohol and unsaturated hydrocarbon, and heating the mixture in the absence of a catalyst at a temperature above about 200° C. and up to about 240° C. and at a pressure sufficient to keep the reactants essentially in the liquid phase until a resinous copolymer-containing product having a hydroxyl number of at least 7.3 is obtained.

5. A process according to claim 4 wherein said hydrocarbon feed comprises cyclopentadiene dimers.

6. A process according to claim 4 wherein said hydrocarbon feed is a cracked naphtha fraction containing from about 20% to 100% by weight of a reactive hydrocarbon components.

7. A process according to claim 6 wherein said naphtha fraction is a fraction produced by severe high temperature, low pressure cracking of a normally gaseous or liquid petroleum fraction.

8. A copolymer according to claim 7 wherein the unsaturated hydrocarbon feed comprises hydrocarbons selected from the group consisting of mono-cyclic olefins, poly-cyclic olefins, mono-cyclic diolefins, poly-cyclic diolefins, aliphatic conjugated diolefins, heat polymerizable vinyl aromatic hydrocarbons, and mixtures thereof.

9. A light-colored resinous copolymer of furfuryl alcohol and indene comprising about 10 to about 40 percent of combined furfuryl alcohol, said copolymer being characterized by a hydroxyl number of at least 7.3.

10. A resinous copolymer of about 5 to 40 parts per 100 parts of a heterocyclic diene alcohol having the formula

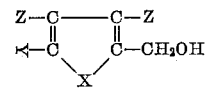

and correspondingly of about 95 to 60 parts per 100 of a reactive olefinically unsaturated hydrocarbon feed which contains 5 to 14 carbon atoms per molecule, said copolymer having a hydroxyl number of at least about 7.3.

11. A resinous copolymer according to claim 10 having a hydroxyl number of at least about 58.9 and wherein said diene alcohol is furfuryl alcohol.

12. A light-colored resinous furfuryl alcohol-hydrocarbon copolymer composition characterized by a hydroxyl number of at least 7.3 and prepared by the process of claim 4.

13. A light-colored resinous furfuryl alcohol-hydrocarbon copolymer characterized by a hydroxyl number of at least 58.9 and prepared by the process of claim 6.

14. A process which comprises mixing a copolymer as defined in claim 11 with an epoxy resin and curing the resulting mixture.

15. A resin blend comprising a copolymer as defined in claim 11 and an epoxy resin.

16. A resin blend comprising a copolymer as defined in claim 11, an epoxy resin and a curing agent.

17. A process which comprises reacting (1) a furfuryl alcohol copolymer as defined in claim 10, (2) a compound selected from the group consisting of diisocyanates and polyisocyanates, and (3) a polyhydroxy alcohol.

References Cited by the Examiner
UNITED STATES PATENTS
2,399,055  4/1946  Nordlander _____ 260—829

MURRAY TILLMAN, Primary Examiner.

P. LIEBERMAN, Assistant Examiner.